(12) United States Patent
Lin

(10) Patent No.: US 10,590,667 B2
(45) Date of Patent: Mar. 17, 2020

(54) AUTOMATIC WALL ADHESION AND CLEANING SYSTEM

(71) Applicant: Yi-Wen Lin, New Taipei (TW)

(72) Inventor: Yi-Wen Lin, New Taipei (TW)

( * ) Notice: Subject to any disclaimer, the term of this patent is extended or adjusted under 35 U.S.C. 154(b) by 118 days.

(21) Appl. No.: 15/995,357

(22) Filed: Jun. 1, 2018

(65) Prior Publication Data
US 2018/0355628 A1 Dec. 13, 2018

(30) Foreign Application Priority Data

Jun. 8, 2017 (TW) ............................. 106119065 A

(51) Int. Cl.
| | |
|---|---|
| *E04G 23/00* | (2006.01) |
| *A47L 1/02* | (2006.01) |
| *E04G 3/32* | (2006.01) |
| *B08B 1/00* | (2006.01) |
| *G05D 1/02* | (2020.01) |
| *B25B 11/00* | (2006.01) |
| *E04G 3/28* | (2006.01) |

(52) U.S. Cl.
CPC .............. *E04G 23/002* (2013.01); *A47L 1/02* (2013.01); *E04G 3/325* (2013.01); *B08B 1/002* (2013.01); *B25B 11/005* (2013.01); *E04G 2003/286* (2013.01); *G05D 1/0274* (2013.01); *G05D 2201/0203* (2013.01)

(58) Field of Classification Search
CPC ... A47L 1/02; E04G 2003/286; E04G 23/002; E04G 3/325; G05D 1/0274; G05D 2201/0203; B08B 1/002; B25B 11/005
See application file for complete search history.

(56) References Cited

U.S. PATENT DOCUMENTS

| | | | | |
|---|---|---|---|---|
| 4,257,138 A * | 3/1981 | Clements | .................. | A47L 1/02 15/103 |
| 5,366,038 A * | 11/1994 | Hidetsugu | ............ | B62D 55/265 180/164 |
| 5,465,446 A * | 11/1995 | Chang | ....................... | A47L 1/02 15/103 |
| 5,715,557 A * | 2/1998 | Hsu | ........................... | A47L 1/02 15/103 |
| 9,689,170 B1 * | 6/2017 | Lange | .................... | E04G 23/002 |
| 2002/0036108 A1 * | 3/2002 | Jeswine | ............. | B62D 49/0621 180/164 |
| 2006/0096050 A1 * | 5/2006 | Simonette | ............... | B08B 3/024 15/103 |
| 2008/0295265 A1 * | 12/2008 | Gorman | ................ | E04G 23/002 15/4 |
| 2014/0109932 A1 * | 4/2014 | Lange | ....................... | A47L 1/02 134/6 |
| 2015/0027494 A1 * | 1/2015 | Ryu | ........................ | A47L 1/03 134/6 |

(Continued)

*Primary Examiner* — Marc Carlson
(74) *Attorney, Agent, or Firm* — Rosenberg, Klein & Lee

(57) ABSTRACT

An automatic wall adhesion and cleaning system includes a cleaning mechanism for cleaning the outer wall of a building, and a vacuum-based wall adhesion mechanism adherable to the outer wall of the building by a vacuum suction force and adapted for carrying and moving the cleaning mechanism on the outer wall of the building. Thus, the automatic wall adhesion and cleaning system can save labor cost and eliminate the risk of human life due to rupture of the ropes of a hanging cage.

17 Claims, 15 Drawing Sheets

(56) References Cited

U.S. PATENT DOCUMENTS

| | | | |
|---|---|---|---|
| 2016/0017619 A1* | 1/2016 | Pitbladdo | E04G 23/002 |
| | | | 134/180 |
| 2017/0188762 A1* | 7/2017 | Wilkes | E04G 23/004 |
| 2018/0168415 A1* | 6/2018 | Liu | A47L 11/38 |
| 2018/0355625 A1* | 12/2018 | Takagi | B66B 9/187 |

* cited by examiner

AUTOMATIC WALL ADHESION AND CLEANING SYSTEM

BACKGROUND OF THE INVENTION

1. Field of the Invention

The present invention relates to building wall cleaning technology, and more particularly to an automatic wall adhesion and cleaning system, which can be adhered to a building wall, walk on the building wall and clean the building wall automatically.

2. Description of the Related Art

At present, due to the advancement of building technology, and the acquisition of land is not easy and in order to strive for the benefits of highly prized land, buildings are constructed higher and higher. Nowadays, there are many high-rise buildings in the metropolitan area, with different appearances and various types of building materials, such as two-dimensional tiles, glass curtains, and other cement walls. However, no matter what type of building, after a long period of time, it will be contaminated by the attachment of dust, rain, and acidic substances, affecting the appearance and lighting effects.

Therefore, at present, most buildings will commission cleaning companies to clean the external walls and glass curtains. Most cleaning methods are performed by hanging cages outside the building to carry out manual cleaning, and the danger of cleaning by hanging cages is high. In addition, falling event can occur due to breakage of the hoisting ropes on both sides of the cage. It is highly dangerous to carry out the task of cleaning the external wall of a building with a cage.

SUMMARY OF THE INVENTION

The present invention has been accomplished under the circumstances in view. It is therefore the main object of the present invention to provide an automatic wall adhesion and cleaning system, which is adhered to and movable on a building wall and equipped with a cleaning mechanism for cleaning the building wall automatically.

It is another object of the present invention to provide an automatic wall adhesion and cleaning system, which can automatically clean the outer wall of a building without the need for high-cost labor, thereby significantly reducing cleaning cost.

It is still another object of the present invention to provide an automatic wall adhesion and cleaning system, which saves labor cost, and eliminates the risk of human life due to rupture of the ropes of a hanging cage.

To achieve this and other objects of the present invention, an automatic wall adhesion and cleaning system comprises a cleaning mechanism and a vacuum-based wall adhesion mechanism. The vacuum-based wall adhesion mechanism comprises a main body, a vacuum suction device, a flexible rubber track and a sealing material. The main body comprises a drive unit at each of two opposite ends thereof. The drive unit provides a power motor. The vacuum suction device is mounted between two opposite side panels of the main body and disposed between the two drive units. The vacuum suction device comprises a plurality of vacuum suction holes arranged on a bottom side thereof in one or multiple rows. Each vacuum suction hole is connected to a vacuum-creating hole in the vacuum suction device through an air tube and a tube connector. The vacuum-creating hole is connected to a vacuum equipment through a pipe. The flexible rubber track is mounted on two drive wheels at two opposite ends of the main body. The sealing material is bonded to the flexible rubber track to hold therein a plurality of vacuum mounts. The flexible rubber track comprises an elastic sealing edge at each of two opposite sides thereof, a plurality of transmission gears therein and a ventilation unit in air communication with each vacuum mount at the sealing material. The ventilation unit comprises an air flow slot cut through each transmission gear of the flexible rubber track, and a plurality of air holes cut through the flexible rubber track. The main body further comprises an adapter located on a top wall thereof for the connection of the cleaning mechanism.

When vacuum equipment is activated, a vacuum suction force is created in the vacuum suction holes of the vacuum suction device. The drive wheels of the drive units at the two opposite ends of the vacuum suction device are rotatable by the respective power motor to move the flexible rubber track As the vacuum mounts at the sealing material are moved with the flexible rubber track into alignment with the respective vacuum suction holes of the vacuum suction device during rotation of the drive wheels, the air flow slots and the air holes work in the flexible rubber track, causing the vacuum mounts at the sealing material to generate a vacuum suction force that adheres the vacuum-based wall adhesion mechanism to the building wall to be cleaned. During rotation of the drive wheels to move the flexible rubber track, the vacuum mounts at the sealing material are moved with the flexible rubber track so that the vacuum mounts re activated in turn to generate a vacuum suction force. As soon as the vacuum mounts at the sealing material are moved away from the corresponding vacuum suction holes of the vacuum suction device, the vacuum suction force is disappeared. When multiple flexible rubber tracks and multiple sets of drive wheels are provided, the vacuum-based wall adhesion mechanism is controllable to do forward, backward and steering movements. Further, the vacuum equipment can be a vacuum pump, vacuum generator or any other design that is capable of creating a vacuum.

DETAILED DESCRIPTION OF THE PREFERRED EMBODIMENT

Figure 1:
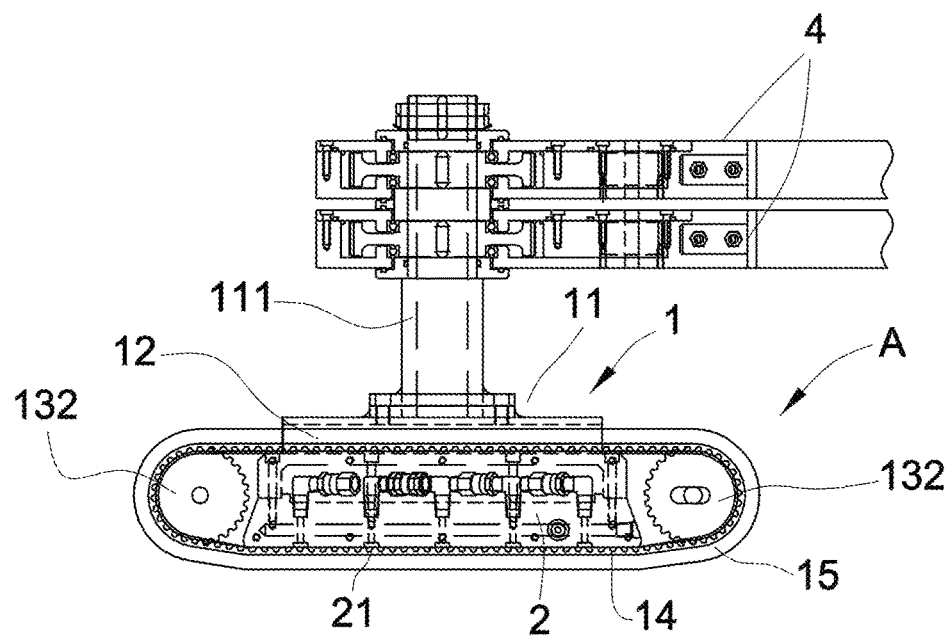
FIG. 1 is a side view of an automatic wall adhesion and cleaning system in accordance with the present invention.
Figure 2:
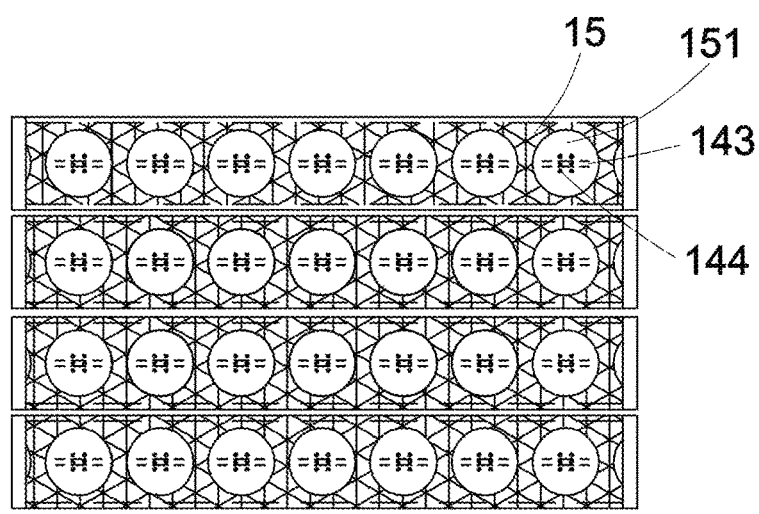
FIG. 2 is a bottom side of FIG. 1.
Figure 3:
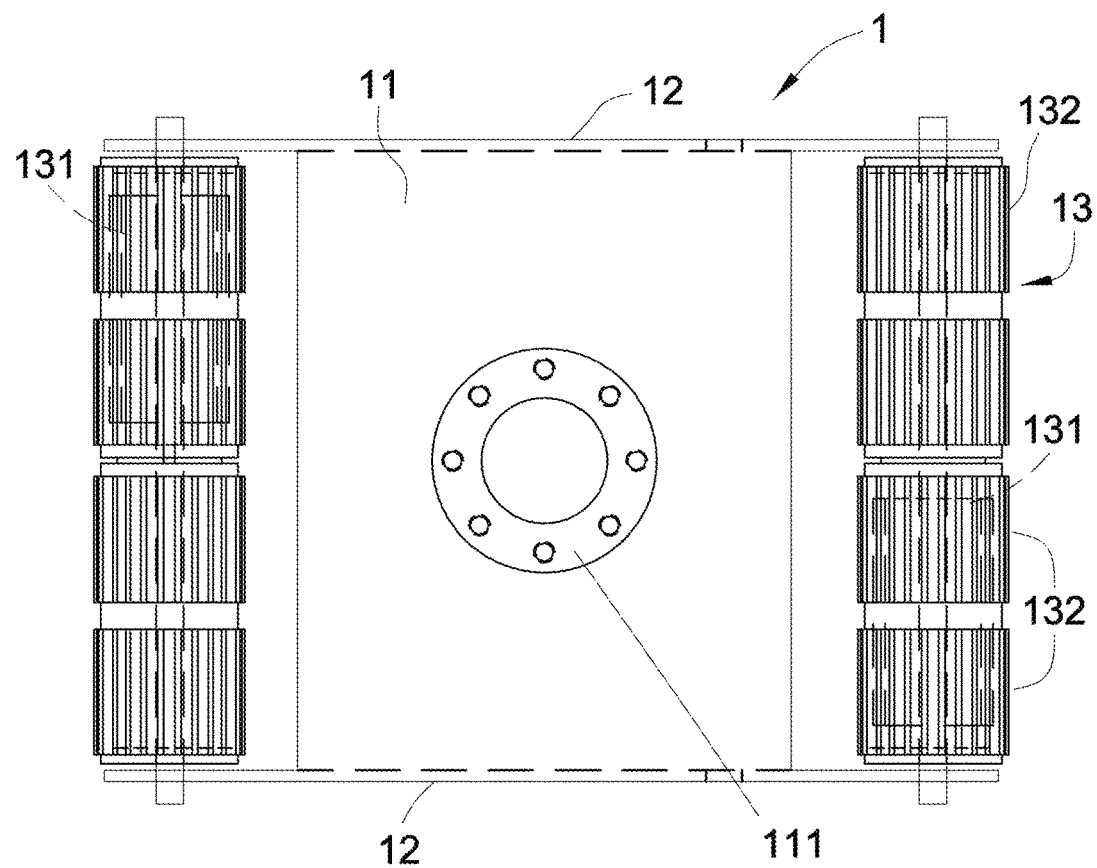
FIG. 3 is a top view of the main body of the automatic wall adhesion and cleaning system in accordance with the present invention.
Figure 4:
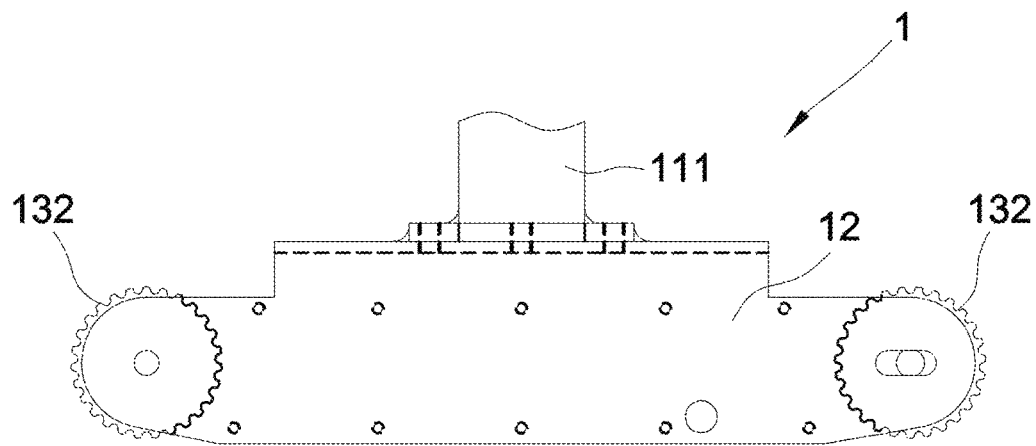
FIG. 4 is a side view of the main body shown in FIG. 3.
Figure 5:
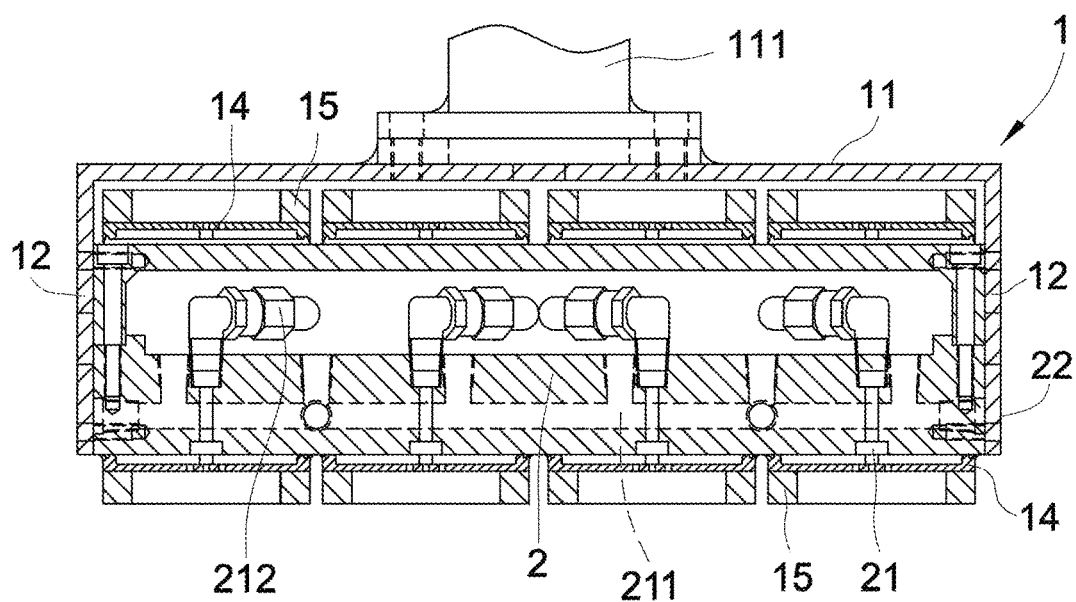
FIG. 5 is a sectional end view, illustrating the vacuum suction device and the main body assembled.
Figure 6:
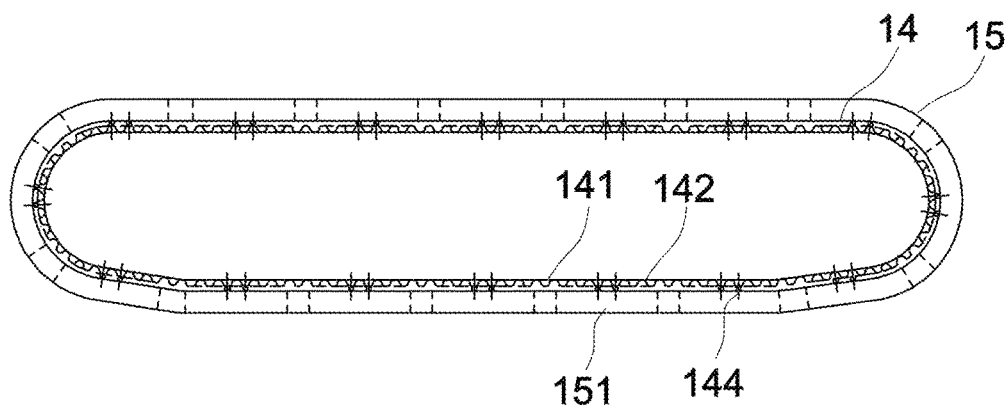
FIG. 6 is a schematic side view illustrating the sealing material mounted around the flexible rubber track.
Figure 7:
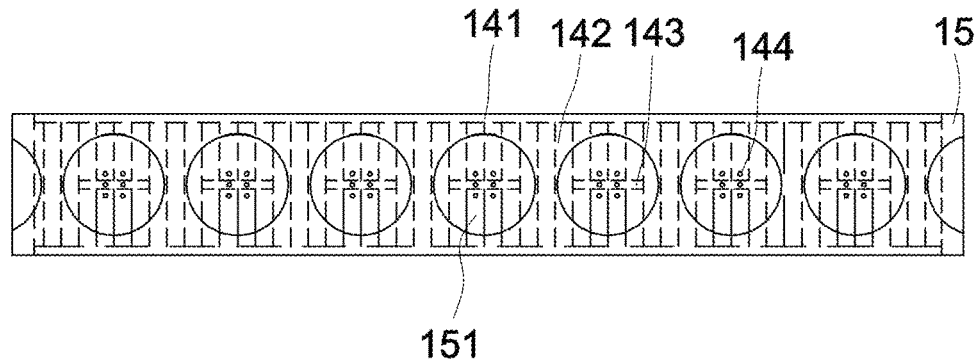
FIG. 7 is a bottom view of the flexible rubber track shown in FIG. 6.
Figure 8:
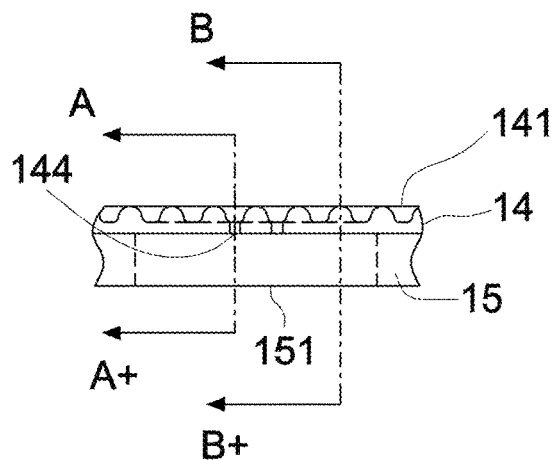
FIG. 8 is an enlarged view of a part of the flexible rubber track shown in FIG. 6.
Figure 9:
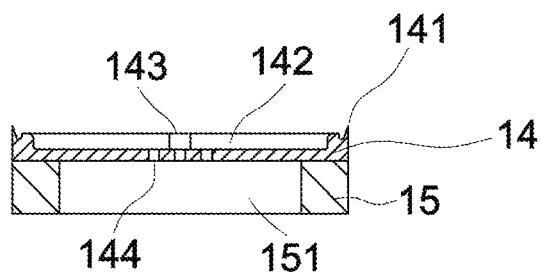
FIG. 9 is a sectional view taken along line A-A of FIG. 8.
Figure 10:
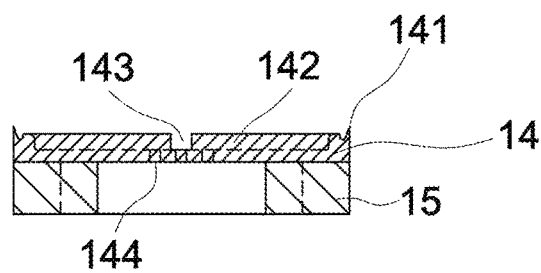
FIG. 10 is a sectional view taken along line B-B of FIG. 8.

Referring to FIGS. 1-5, the present invention provides an automatic wall adhesion and cleaning system, which comprises a cleaning mechanism and a vacuum-based wall adhesion mechanism (A). The vacuum-based wall adhesion mechanism (A) comprises a main body (1), a vacuum suction device (2), a flexible rubber track (14) and a sealing material (15). The main body (1) comprises a drive unit (13) at each of two opposite ends thereof. Each drive unit (13) comprises a power motor (131) and a plurality of drive wheels (132) coupled to and rotatable by the power motor (131). The vacuum suction device (2) is mounted between two side panels (12) of the main body (1) and disposed between the two drive units (13), comprising at least one row of vacuum suction holes (21), a vacuum-creating hole (22) connected to a vacuum creating means, for example, vacuum pump (not shown), and a plurality of air tubes (211) and tube connectors (212) arranged to connect the vacuum suction holes (21) to the vacuum-creating hole (22). The flexible rubber track (14) is mounted around the drive wheels (132) of the two drive units (13). The sealing material (15) seals the flexible rubber track (14) to prevent air leakage. The main body (1) further comprises a plurality of vacuum mounts (151) mounted in the sealing material (15) (see FIGS. 6-10). The flexible rubber track (14) comprises an elastic sealing edge (141) located on each of two opposite lateral sides thereof, and a plurality of transmission gears (142) arranged around an inside wall thereof adjacent to each elastic sealing edge (141), and a ventilation unit in air communication with each vacuum mount (151) at the sealing material (15). The ventilation unit comprises an air flow slot (143) cut through each transmission gear (142) of the flexible rubber track (14) and a plurality of air holes (144) cut through the flexible rubber track (14). The main body (1) further comprises an adapter (111) located on a top wall (11) thereof for the connection of the cleaning mechanism.

When the vacuum pump is activated, vacuum suction force is created in the vacuum suction holes (21) of the vacuum suction device (2). The drive wheels (132) of the drive units (13) at the two opposite ends of the vacuum suction device (2) are rotatable by the respective power motor (131) to move the flexible rubber track (14). As the vacuum mounts (151) at the sealing material (15) are moved with the flexible rubber track (14) into alignment with the respective vacuum suction holes (21) of the vacuum suction device (2) during rotation of the drive wheels (132), the air flow slots (143) and the air holes (144) work in the flexible rubber track (14), causing the vacuum mounts (151) at the sealing material (15) to generate a vacuum suction force to adhere the vacuum-based wall adhesion mechanism (A) to the wall to be cleaned. During rotation of the drive wheels (132) to move the flexible rubber track (14), the vacuum mounts (151) at the sealing material (15) are moved with the flexible rubber track (14) so that the vacuum mounts (151) are activated in turn to generate a vacuum suction force. As soon as the vacuum mounts (151) at the sealing material (15) are moved away from the corresponding vacuum suction holes (21) of the vacuum suction device (2), the vacuum suction force is disappeared. In this way, the vacuum-based wall adhesion mechanism (A) can travel smoothly. When multiple flexible rubber tracks (14) and multiple sets of drive wheels (132) are provided, the vacuum-based wall adhesion mechanism (A) can be controlled to do forward, backward and steering movements. Further, vacuum pump, vacuum generator or any other equipment capable of creating a vacuum can be used with the vacuum suction device (2) for creating a vacuum suction force.

Figure 11:
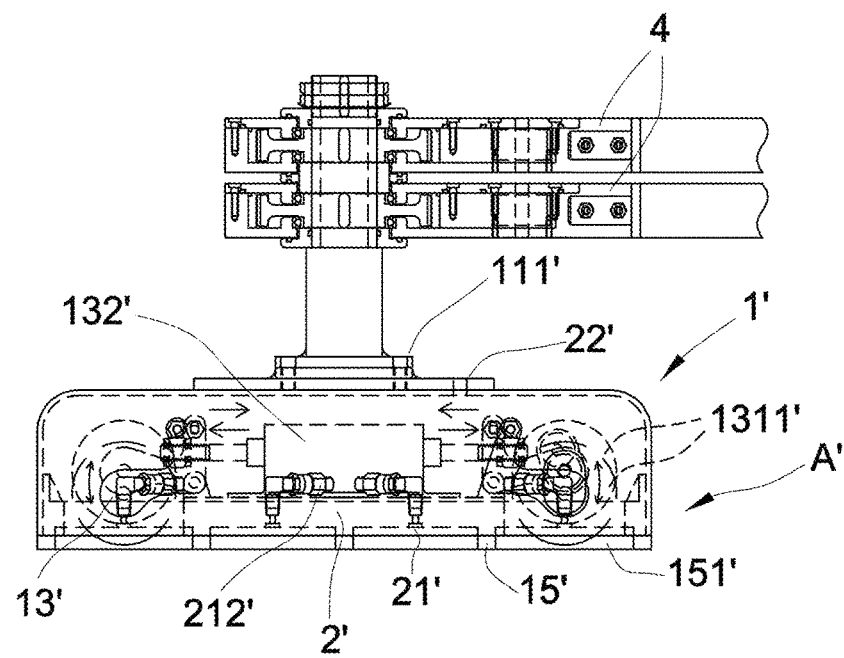
FIG. 11 is a side view of a wheeled design of vacuum-based wall adhesion mechanism.
Figure 12:
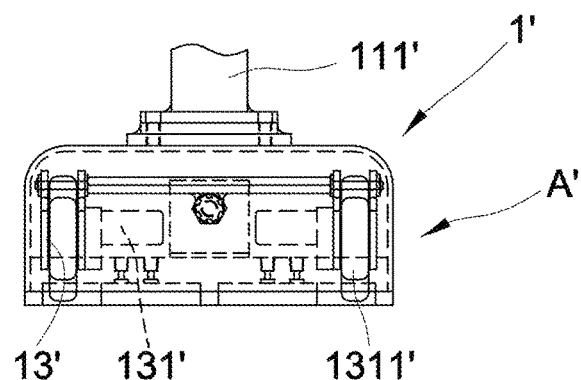
FIG. 12 is an end view of the wheeled design of vacuum-based wall adhesion mechanism shown in FIG. 11.
Figure 13:
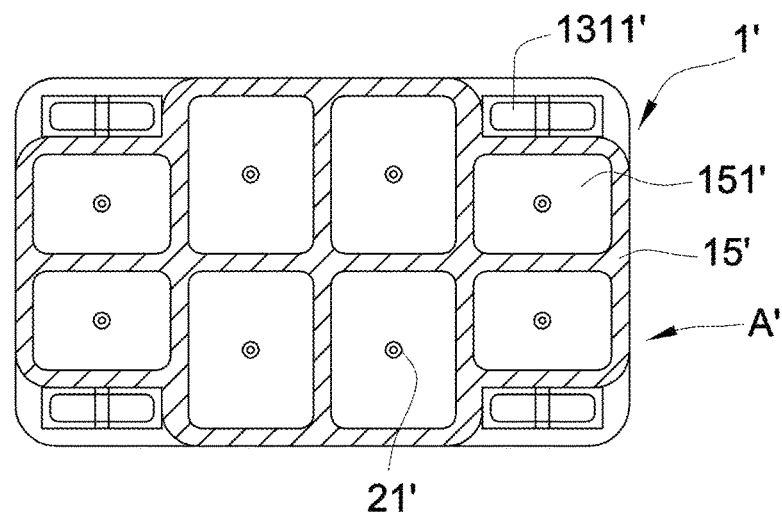
FIG. 13 is a bottom view of the wheeled design of vacuum-based wall adhesion mechanism shown in FIG. 11.

Referring to FIGS. 11-13 illustrate an alternate form of the vacuum-based wall adhesion mechanism. According to this alternate form, the vacuum-based wall adhesion mechanism (A') is a wheeled design. The design of the vacuum suction device (2') mounted in the main body (1') is same as that shown in FIG. 5. The vacuum pump is connected with the vacuum-creating holes (22') of the vacuum suction device (2') in the main body (1') through air pipes and air pipe connectors (212'); the sealing material (15') is mounted on the bottom suction surface of the vacuum suction device (2'); vacuum mounts (151') are mounted in the sealing material (15') corresponding to the respective vacuum suction holes (21') of the vacuum suction device (2') so that when the vacuum pump is activated, a suction force is created in each vacuum suction hole (21') of the vacuum suction device (2'). Further, moving wheels (1311') can be provided at the two opposite ends of the main body (1'), and a power motor (131') is provided for rotating the moving wheel (1311'). Alternatively, a hoist can be used with safety hoisting ropes to control movement of the moving wheels (1311') instead of the power motor (131'). The moving wheels (1311') at each end of the main body (1') is mounted in a wheel holder (13'). Each wheel holder (13') is coupled to a telescopic mechanism (132'). The telescopic mechanism (132') is operable to move the wheel holder (13'), thereby adjusting the elevation of the associating moving wheels (1311'). Thus, the moving wheels (1311') can maintain the proper contact distance with the building wall. With the use of the safety hoisting ropes, the vacuum-based wall adhesion mechanism (A') can be adhered to the building wall positively and can also be controlled to move on the building wall. As soon as the vacuum-based wall adhesion mechanism (A') reaches the expected location, the telescopic mechanism (132') is controlled to lift the wheel holders (13'), retracting the moving wheels (1311') inwardly from the suction surface of the vacuum suction device (2') so that the suction surface of the vacuum suction device (2') can be kept in close contact with the building wall, enhancing the suction force of the vacuum-based wall adhesion mechanism (A'). The telescopic mechanism (132') is mainly used to control the elevation of the moving wheels (1311') and is not limited to a specific structural form. A motor or an electromagnet or a telescopic cylinder can be used for the telescopic mechanism (132').

FIGS. 14-25 and FIG. 31 illustrate the application of the vacuum-based wall adhesion mechanism (A) or (A').

Before the operation of the vacuum-based wall adhesion mechanism (A)(A'), safety hoisting ropes (5) are suspended as required. When moving up and down, it is controlled by a sensor or a control program, so that the lifting speed of the hoist that controls the safety hoisting ropes (5) is consistent with the traveling speed of the vacuum-based wall adhesion mechanism (A)(A'). Subject to the control of the upper suspension cantilever, the safety hoisting ropes (5) and the vacuum-based wall adhesion mechanism (A)(A') are controlled to move left and right and up and down synchronously on the building wall (B). The hoist can be mounted on the vacuum-based wall adhesion mechanism (A)(A') or installed at an appropriate position of the upper suspension cantilever.

Figure 14:
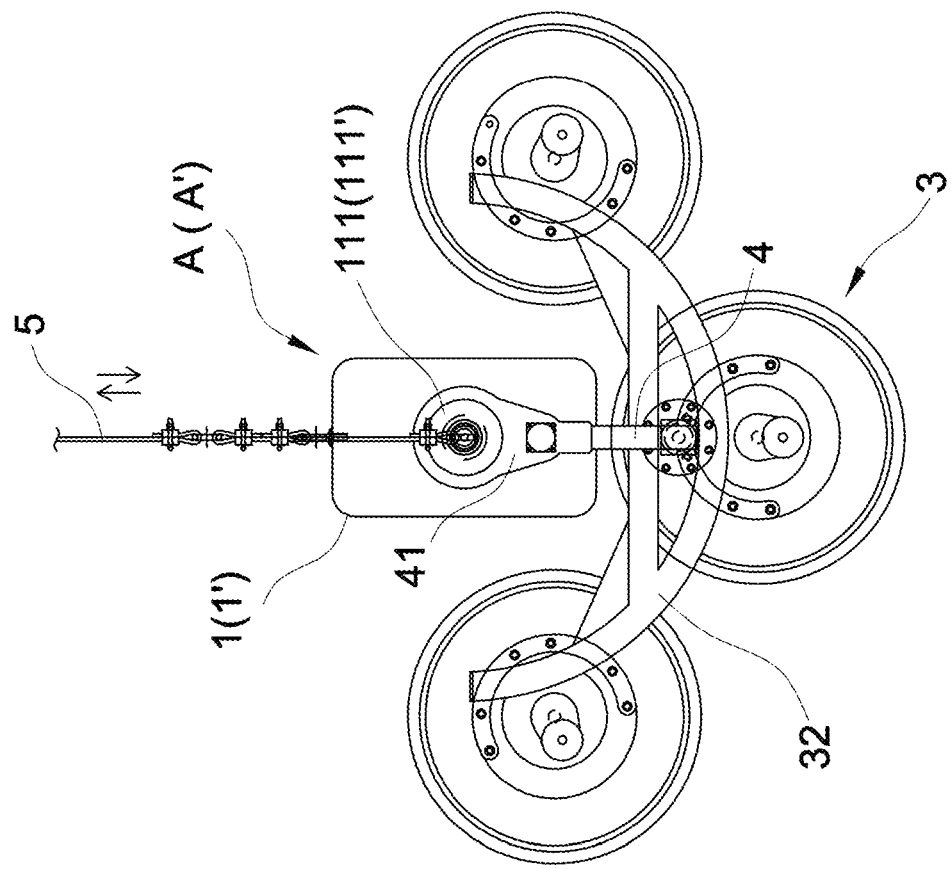
FIG. 14 is a front view illustrating multiple brush-type cleaning brush wheels mounted on one single cantilever robotic arm.
Figure 15:
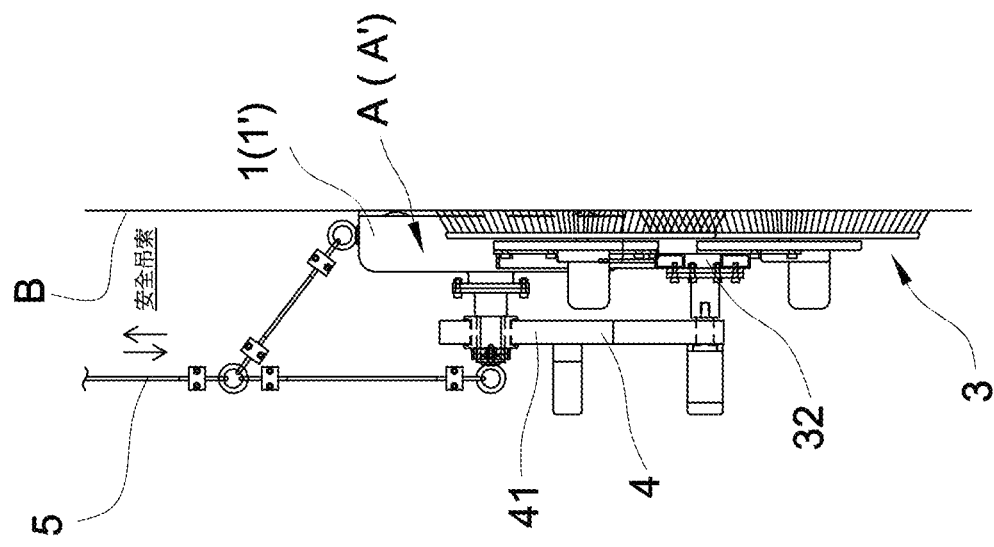
FIG. 15 is a side view of the structure shown in FIG. 14.
Figure 16:
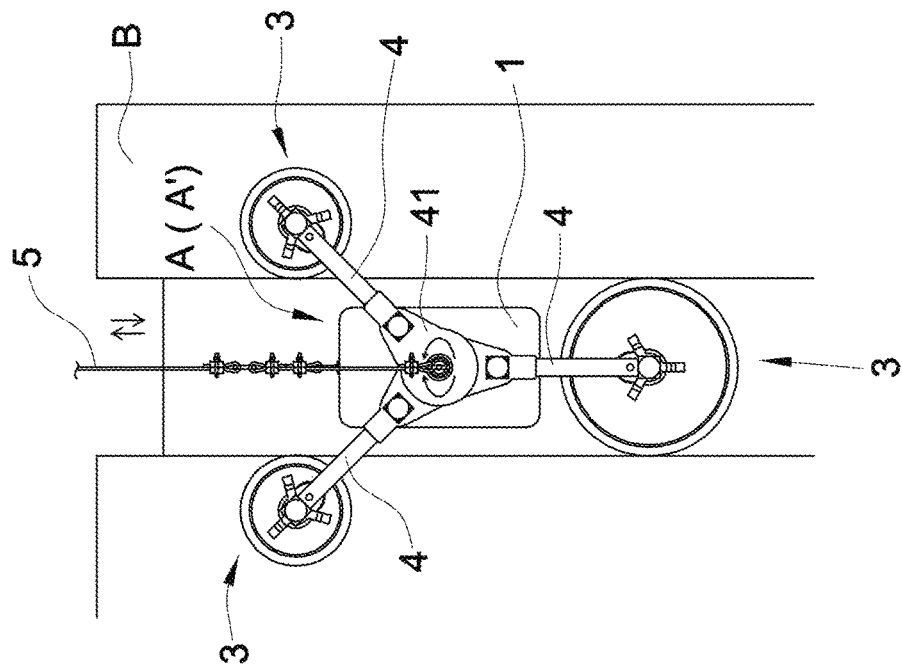
FIG. 16 is a front view illustrating different designs and sizes of brush-type cleaning brush wheels mounted on three cantilever robotic arms.
Figure 17:
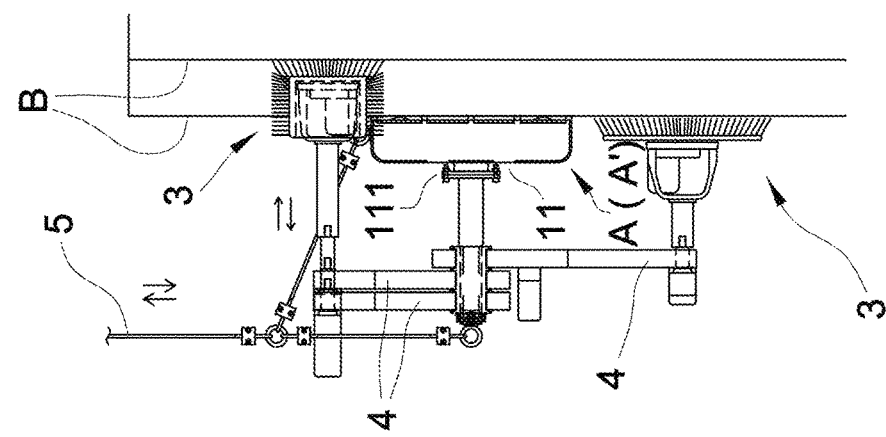
FIG. 17 is a side view of the structure shown in FIG. 16.
Figure 18:
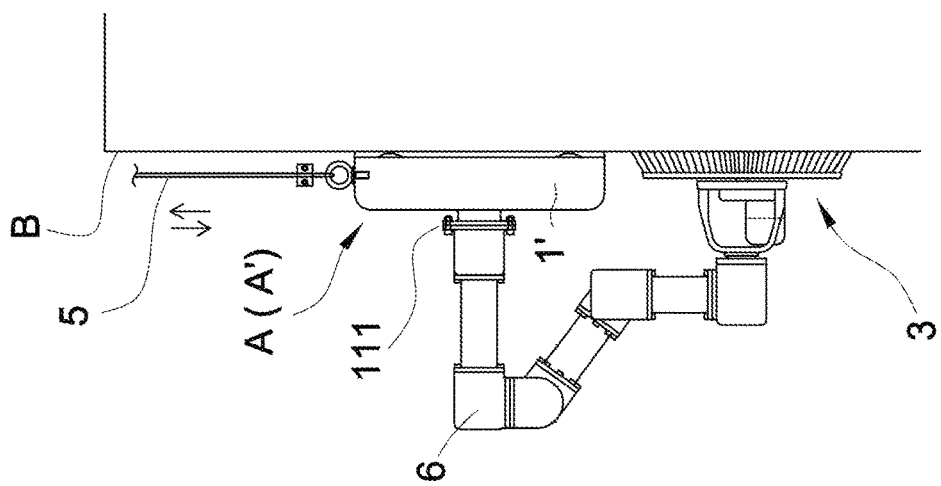
FIG. 18 is a side view illustrating one single brush-type cleaning brush wheel mounted on an articulated robotic arm at the vacuum-based wall adhesion mechanism.
Figure 19:
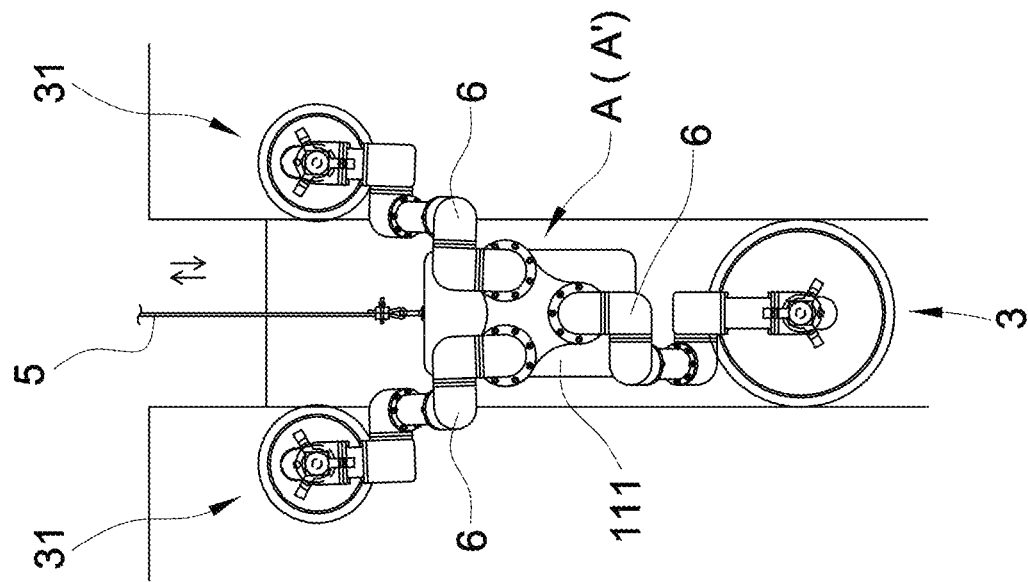
FIG. 19 is a front view, illustrating a brush-type and roller-type cleaning brush wheels mounted on three articulated robotic arms at the vacuum-based wall adhesion mechanism.
Figure 20:
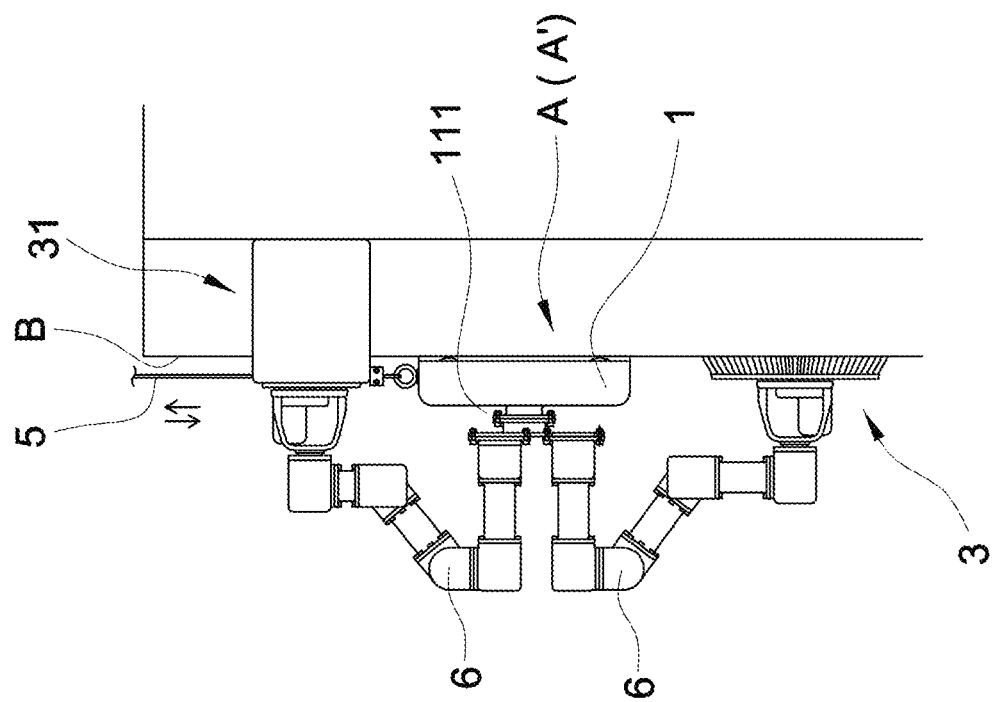
FIG. 20 is a side view of the structure shown in FIG. 19.
Figure 21:
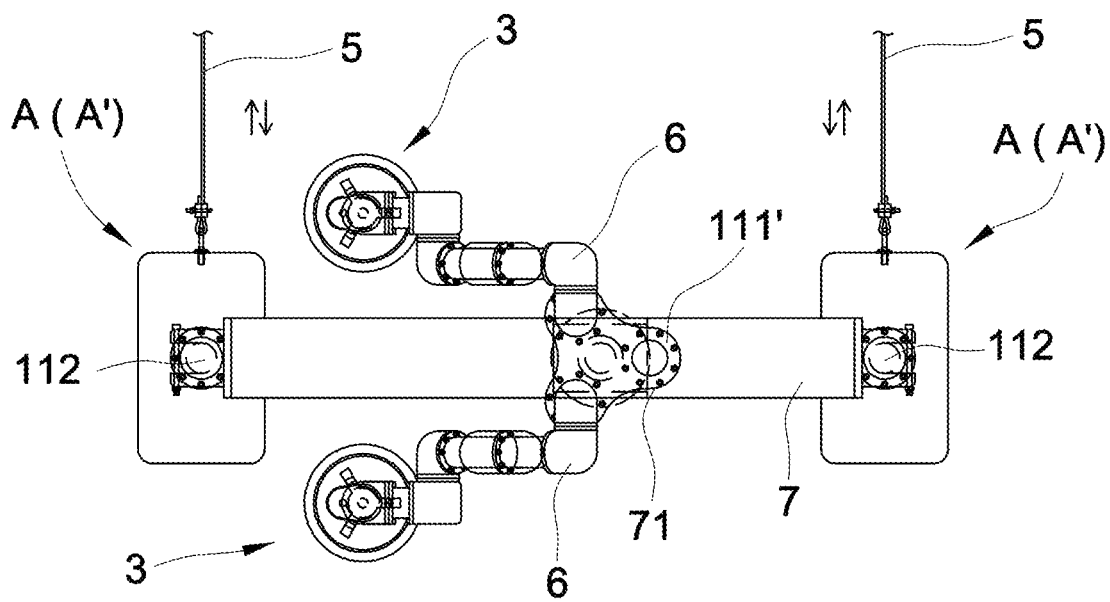
FIG. 21 illustrates an X-axis power linear actuator connected between two vacuum-based wall adhesion mechanisms and two articulated robotic arms mounted on the moving carriage of the X-axis power linear actuator to hold two brush-type cleaning brush wheels.
Figure 22:
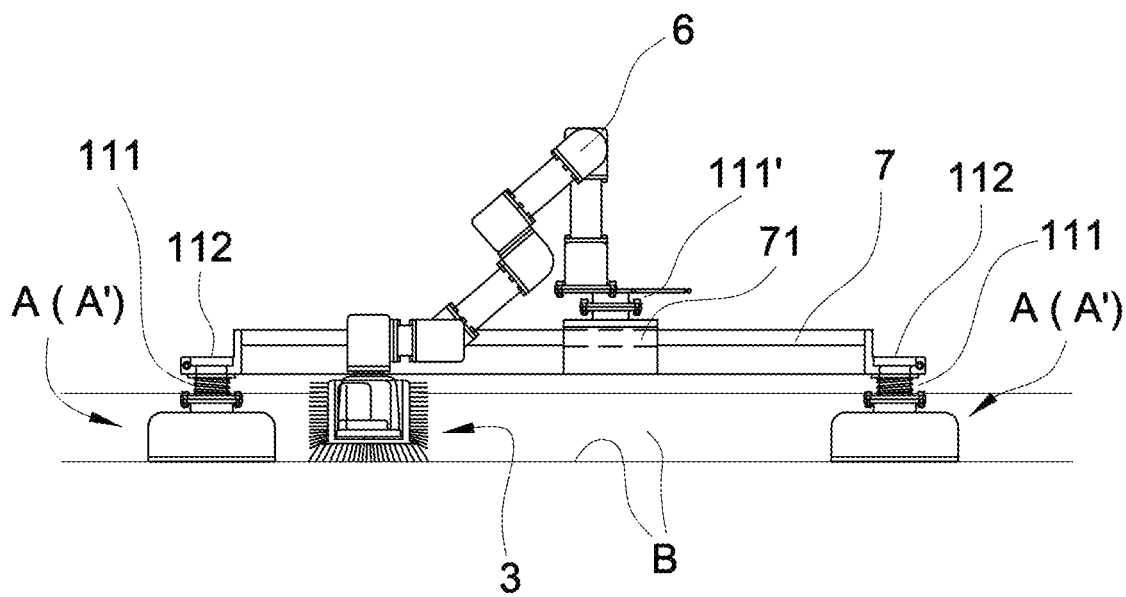
FIG. 22 is a side view of the structure shown in FIG. 21.
Figure 23:
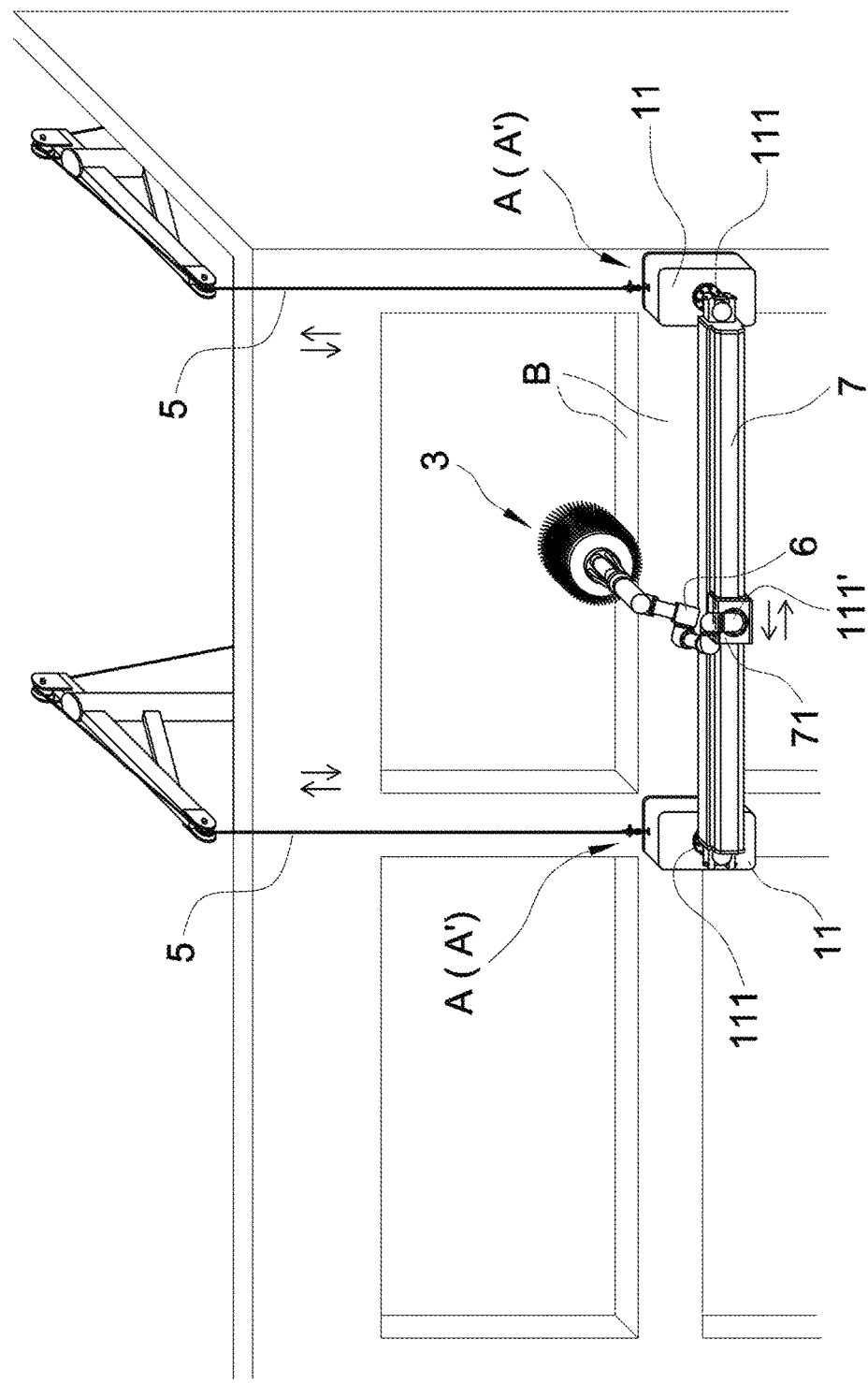
FIG. 23 is an elevational view illustrating two vacuum-based wall adhesion mechanisms connected to the safety hoisting ropes of a hoist, an X-axis power linear actuator connected between the two vacuum-based wall adhesion mechanisms, and a robotic arm mounted on the moving carriage and holding a cleaning brush wheel.
Figure 24:
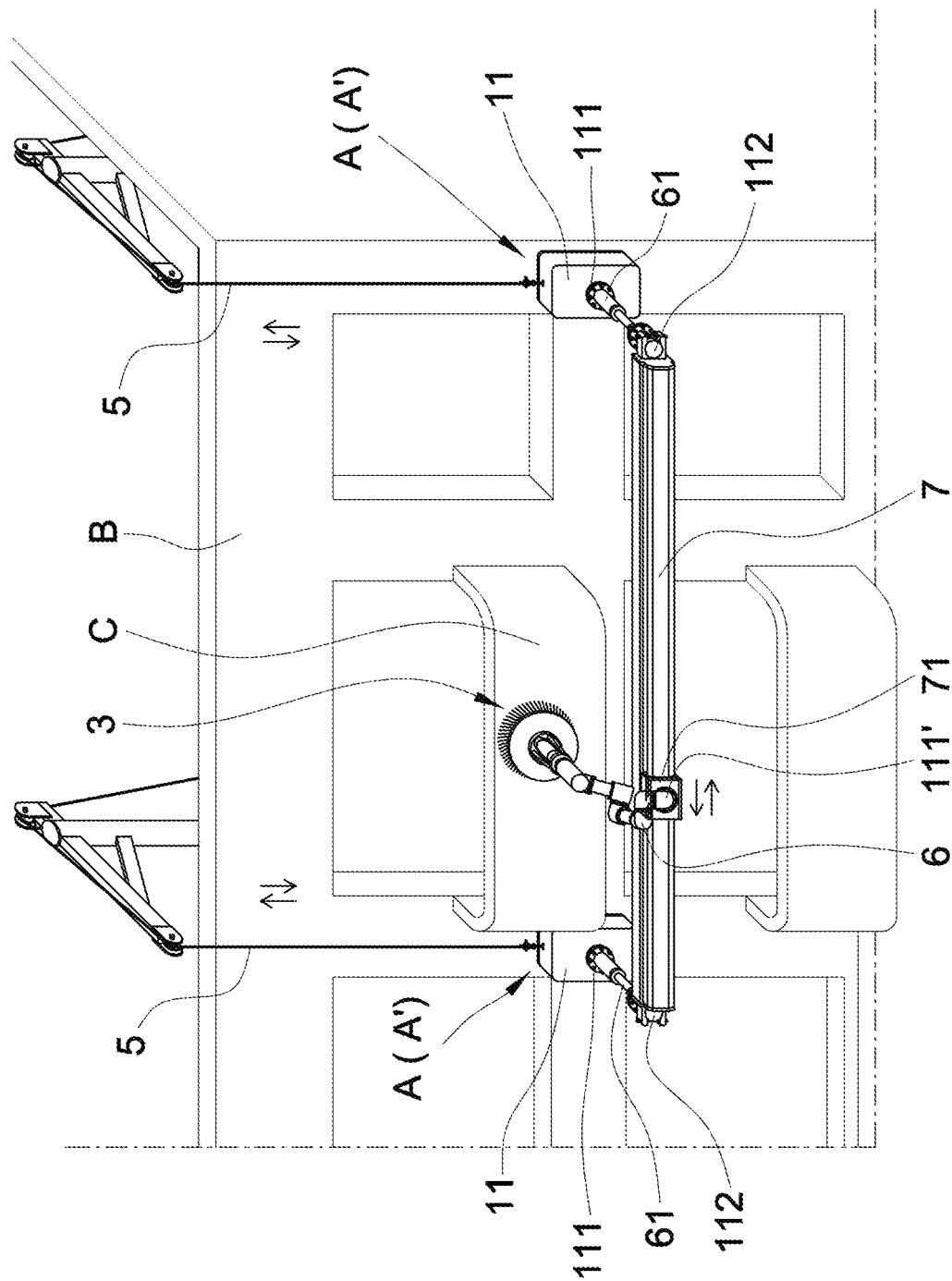
FIG. 24 illustrates a Z-axis retractable rod mounted on each of two vacuum-based wall adhesion mechanisms to support an X-axis power linear actuator and a robotic arm mounted to the X-axis power linear actuator to hold a brush-type cleaning brush wheel.

The adapter (111) is installed on the vacuum-based wall adhesion mechanism (A)(A'). By means of the adapter (111), a robotic arm can be assembled on the vacuum-based wall adhesion mechanism (A)(A'). The robotic arm can be a cantilever robotic arm (4) shown in FIGS. 14-17, or an articulated robotic arm (6) shown in FIGS. 18-25 and FIG. 31. The robotic arm has the distal end thereof provided with a cleaning brush wheel for cleaning the building wall. The cleaning brush wheel can be used in different forms or different materials in response to different wall surface cleaning needs. It can be, for example, a brush-type cleaning brush wheel (3) or a roller-type cleaning brush wheel (31), etc. FIGS. 14-17 illustrate the application of a brush-type cleaning brush wheel (3). In FIGS. 14 and 15, a coupler (32) is used to couple three brush-type cleaning brush wheels (3) together. As shown in FIGS. 14-17, a rotary mechanism (41) is used for allowing rotation of the cantilever robotic arm (4). In FIGS. 19 and 20, a brush-type cleaning brush wheel (3) and a roller-type cleaning brush wheel (31) are used for cleaning the building wall (B) when the vacuum-based wall adhesion mechanism (A)(A') is adhered to the building wall (B) by a suction force. The cantilever robotic arm (4) or articulated robotic arm (6) is assembled with the brush-type cleaning brush wheel (3) and/or the roller-type cleaning brush wheel (31) to constitute an automatic wall cleaning mechanism.

The two vacuum-based wall adhesion mechanisms (A) (A') can be used simultaneously in order to meet the needs of cleaning the building walls (B) different types of modern buildings. A coupler (112) can be installed on each of the two vacuum-based wall adhesion mechanisms (A)(A') to hold an X-axis power linear actuator (7). The X-axis power linear actuator (7) has the two opposite ends thereof respectively connected to the vacuum-based wall adhesion mechanisms (A)(A'). The X-axis power linear actuator (7) supports a moving carriage (71) that is movable left and right in X-axis. Thus, the X-axis power linear actuator (7) can be controlled to move the automatic wall cleaning mechanism in the X-axis direction, not limited by the form of the linear actuator or the installation angle of the linear actuator. The adapter (111') is installed on the moving carriage (71) to support the automatic wall cleaning mechanism. Subject to the arrangement described above, the automatic wall cleaning mechanism can be moved smoothly and steadily left and right in the X-axis (horizontal) direction. At this time, the vacuum-based wall adhesion mechanisms (A)(A') at the two opposite ends of the X-axis power linear actuator (7) are disposed in close contact with the building wall (B), thus, it is not necessary to install additional vacuum-based wall adhesion mechanisms (A)(A') on the cleaning mechanism at the adapter (111') of the moving carriage (71) (see FIGS. 21-24). This arrangement is included in the scope of the present invention.

Figure 25:
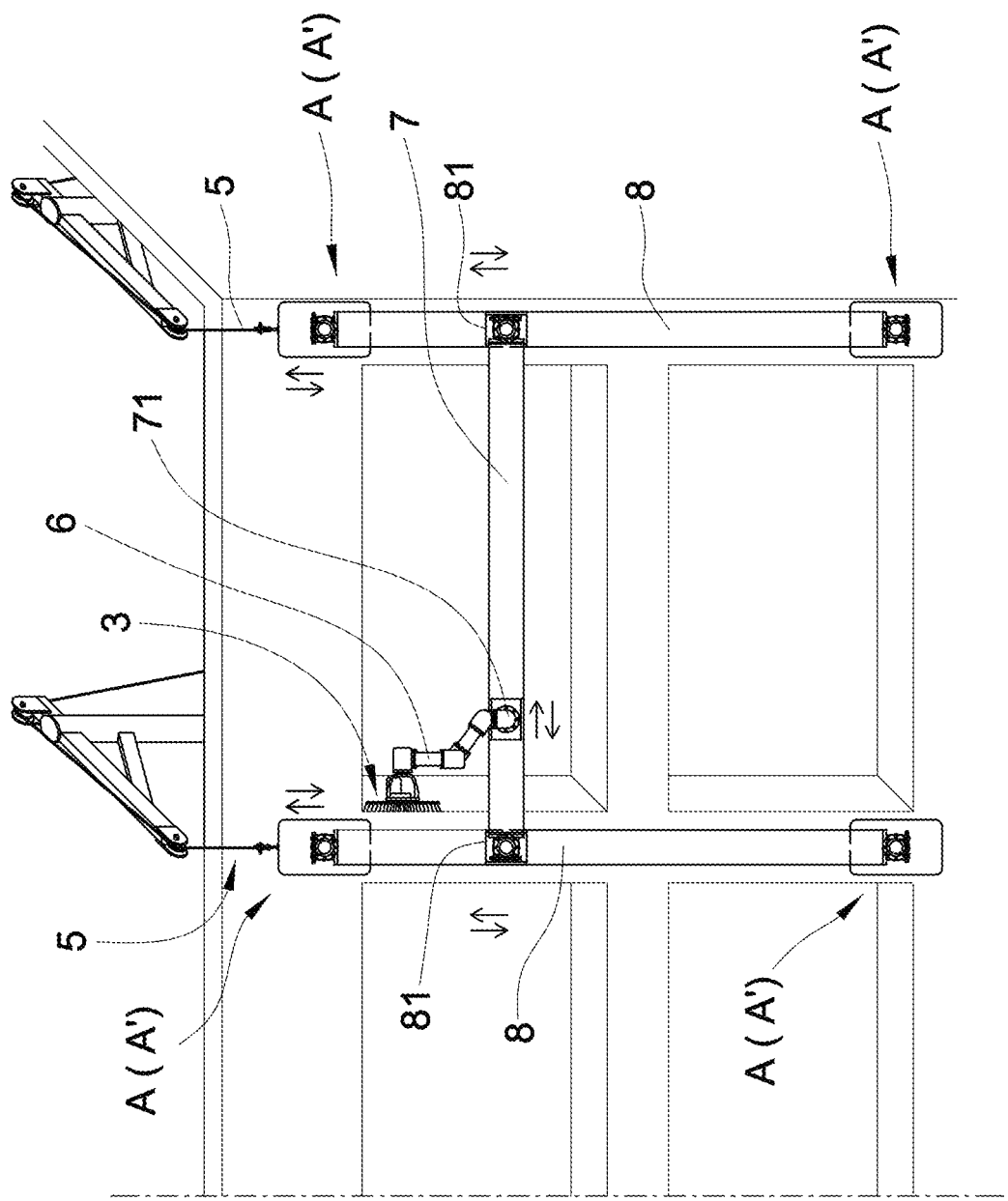
FIG. 25 illustrates an X-axis power linear actuator provided between the moving carriages of two Y-axis power linear actuators to support a moving carriage, and the X-axis power linear actuator of FIG. 23 and the cleaning mechanism assembled on the moving carriage of the Y-axis power linear actuator.
Figure 26:
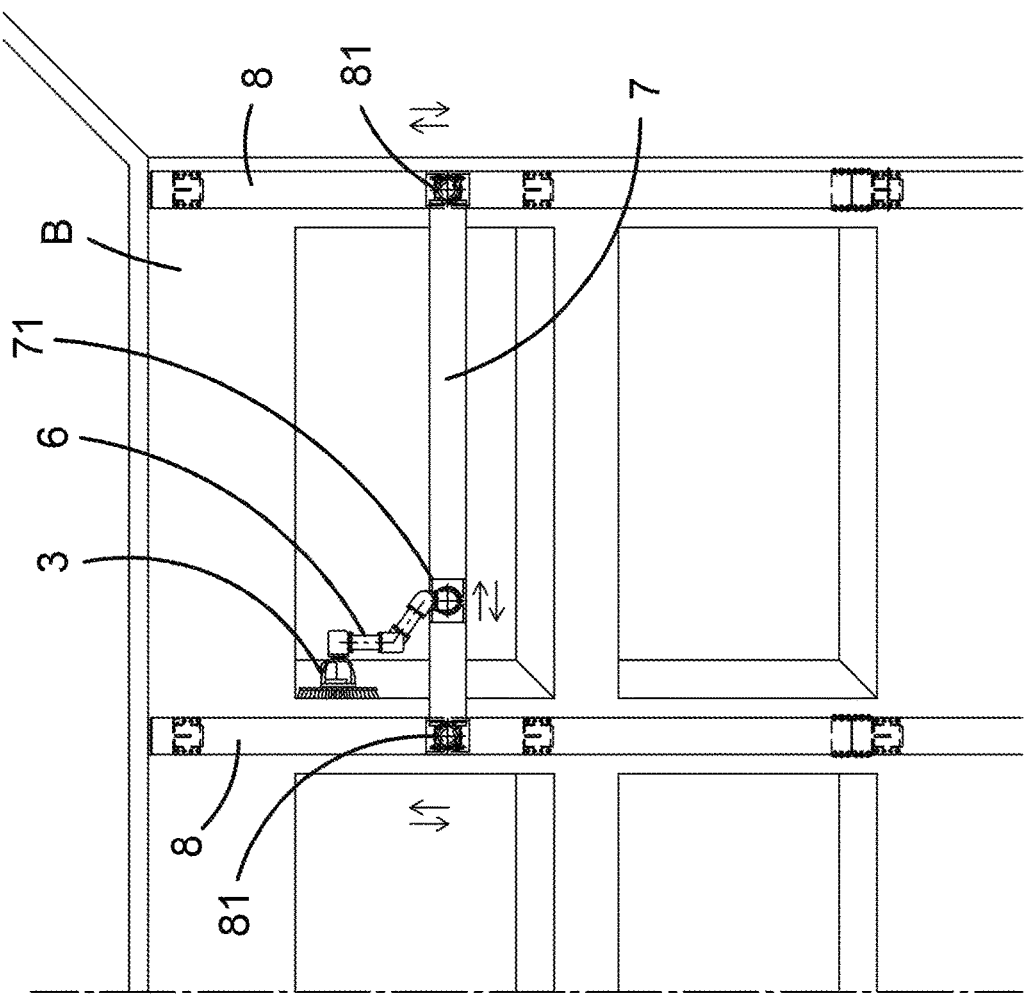
FIG. 26 illustrates female adapter members installed on the building wall and an equal number of male adapter members mounted at the Y-axis power linear actuator for connection to the respective female adapter members, and an actuator coupling used to connect two Y-axis power linear actuators in series for extending the moving distance of the moving carriage.
Figure 27:
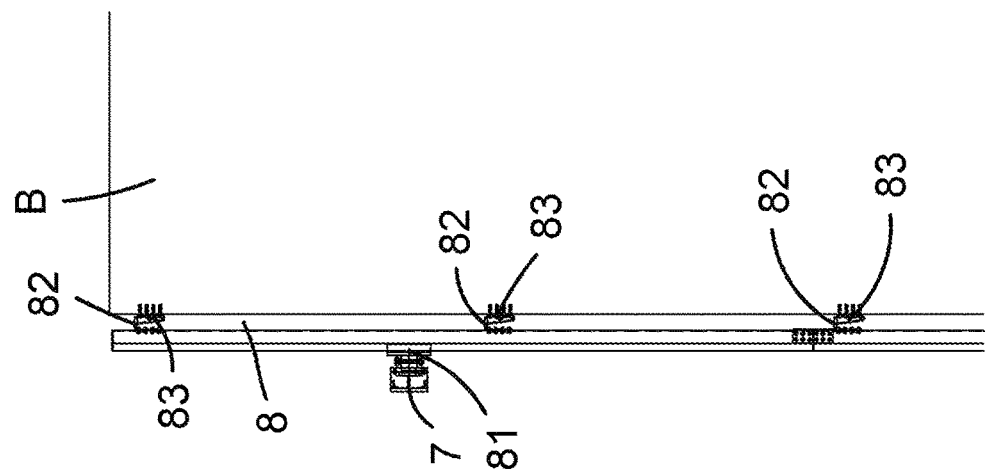
FIG. 27 is a side view of the structure shown in FIG. 26.
Figure 28:
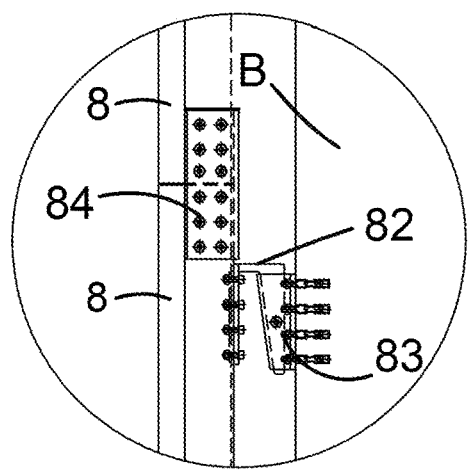
FIG. 28 is an enlarged view of a part of FIG. 27.
Figure 29:
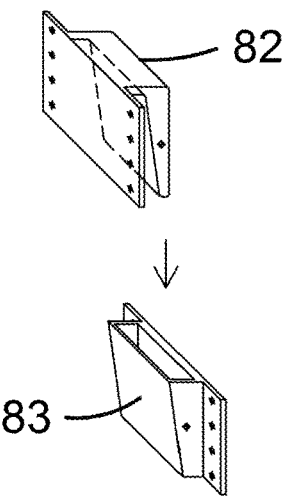
FIG. 29 is an exploded view of the male and female adapter members of the Y-axis power linear actuator.
Figure 30:
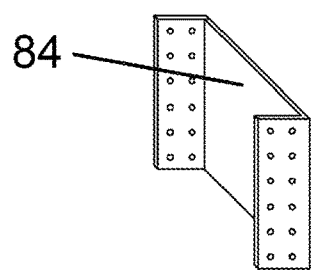
FIG. 30 is an elevational view of the actuator coupling.
Figure 31:
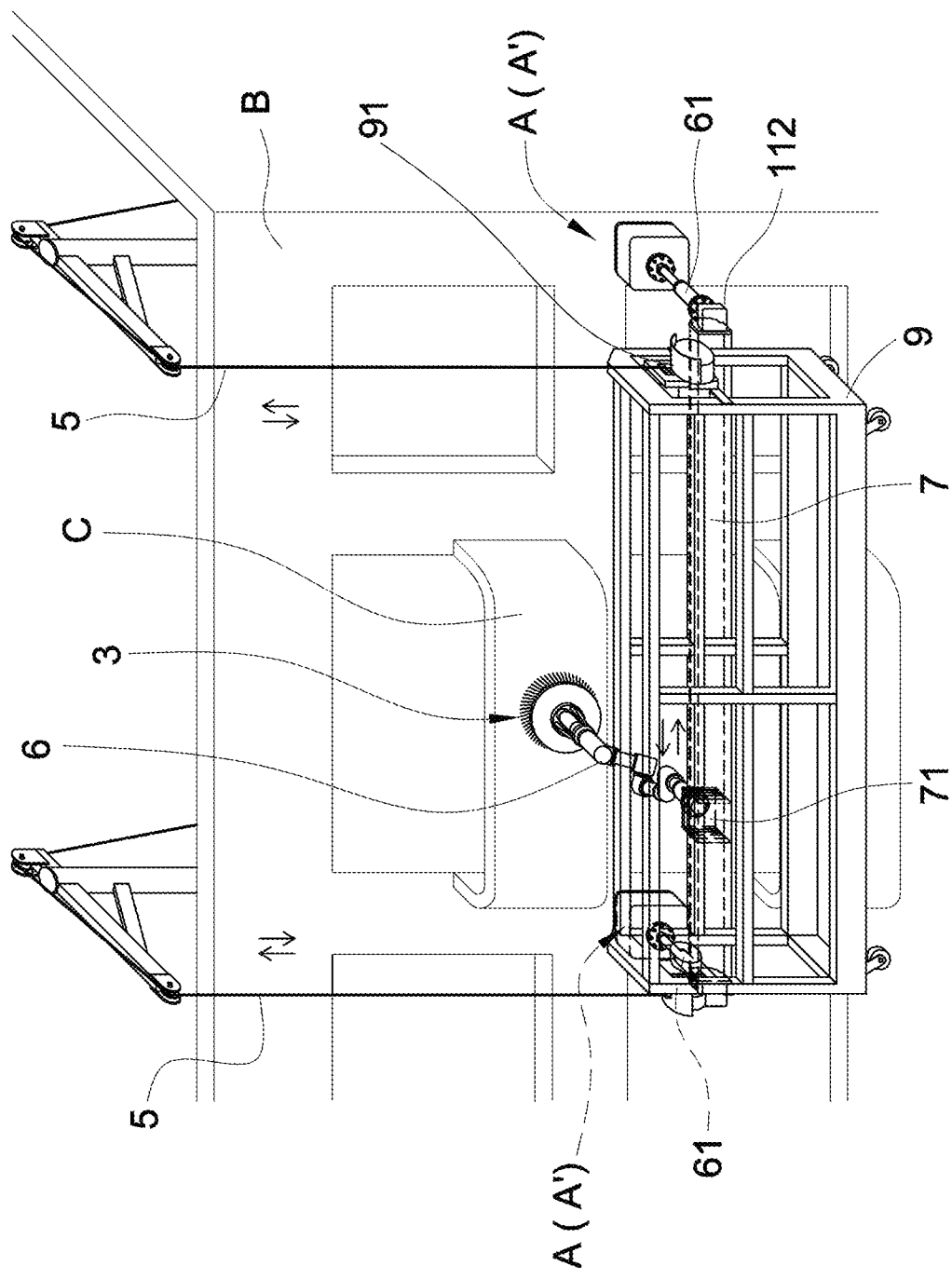
FIG. 31 illustrates the structure of FIG. 24 assembled with a hanging cage

To meet the needs for cleaning building walls (B) of different configurations, more than two vacuum-based wall adhesion mechanisms (A)(A') can be used. When four vacuum-based wall adhesion mechanisms (A)(A') are used, these vacuum-based wall adhesion mechanisms (A)(A') are arranged in two sets and disposed at different elevations. An adapter (111) is provided in each set of vacuum-based wall adhesion mechanisms (A)(A') to hold a Y-axis power linear actuator (8) that supports a moving carriage (81). Each Y-axis power linear actuator (8) is controlled to move the associating moving carriage (81) up and down. An X-axis power linear actuator (7) is provided between the moving carriages (81) of the two Y-axis power linear actuators (8) to support a moving carriage (71). The X-axis power linear actuator (7) is controllable to move the moving carriage (71) left and right in the horizontal direction. The automatic wall cleaning mechanism is installed on the adapter (111') at the moving carriage (71) of the X-axis power linear actuator (7). Subject to the adhesion of the four vacuum-based wall adhesion mechanisms (A)(A') to the building wall, the automatic wall cleaning mechanism on the X-axis power linear actuator (7) can be moved in the X-axis direction as well as the Y-axis direction to clean the building wall thoroughly. In this case, the automatic wall cleaning mechanism can be moved flexibly even if no moving traveling device is installed on the four vacuum-based wall adhesion mechanisms (A)(A'). At this time, as illustrated in FIG. 25, the vacuum-based wall adhesion mechanism (A) focuses on the suction force over a large area, and the number of vacuum suction holes does not necessarily affect the suction force of the vacuum-based wall adhesion mechanism (A), which should still be covered within the scope of the present invention.

As described above, to meet the needs for cleaning building walls (B) of different configurations, the adapter (111) at the Y-axis power linear actuator (8) consists of male and female adapter members (82) and (83). Two ore more female adapter members (83) are installed on the building wall (B). An equal number of male adapter members (82) are mounted at the Y-axis power linear actuator (8) for connection to the respective female adapter members (83), thus, the Y-axis power linear actuator (8) is secured to the building wall (B). According to this arrangement, the Y-axis power linear actuators (8) without the vacuum-based wall adhesion mechanisms (A)(A') can be secured to the building wall (B), allowing the automatic wall cleaning mechanism that is installed on the moving carriage (71) of the X-axis power linear actuator (7) can be moved vertically and horizontally. The male and female adapter members (82) and (83) can be variously embodied for positively securing the Y-axis power linear actuator (8) to the building wall (B) without departing from the spirit and scope of the present invention. Further, an actuator coupling (84) can be used to connect two Y-axis power linear actuators (8) in a series, extending the moving distance of the moving carriage (81) (see FIGS. 26-30).

For cleaning a building wall of a special configuration, for example, for cleaning a building wall having a convex shape or a balcony that protrudes too much from the building wall (C), a Z-axis retractable rod (61) is mounted on each of the vacuum-based wall adhesion mechanisms (A)(A') to support the X-axis power linear actuator (7). By means of synchronously extending out or retracting the two retractable rods (61), the automatic wall cleaning mechanism at the X-axis power linear actuator (7) is movable with the safety hoisting ropes (5) in the Y-axis direction. Thus, the automatic wall cleaning mechanism can be moved in X-axis, Y-axis and Z-axis directions relative to the building wall (C) (see FIGS. 24-31).

The automatic wall adhesion and cleaning system may also be connected and fixed to a hanging mechanism. The hanging mechanism can be a hanging cage (9) or other form. An X-axis power linear actuator (7) is installed on the hanging mechanism to support a moving carriage (71) that can be driven to move on the X-axis power linear actuator (7) horizontally toward the left or right side. The automatic wall cleaning mechanism is installed on the adapter (111') that is mounted on the moving carriage (71) of the X-axis power linear actuator (7). Thus, the automatic wall cleaning mechanism at the moving carriage (71) can be moved smoothly on the X-axis power linear actuator (7) in the horizontal direction. A retractable rod (61) is mounted at each of two opposite sides of the hanging mechanism. The vacuum-based wall adhesion mechanisms (A)(A') are mounted at the ends of the retractable rods (61). Subject to the coupling between the retractable rods (61) and the vacuum-based wall adhesion mechanisms (A)(A'), the automatic wall cleaning mechanism is maintained stable during its cleaning operation (see FIG. 31). Attached accessories of the automatic wall cleaning mechanism such as cleaning fluid, water bucket, slop tank, vacuum equipment, circuit equipment, etc. can be placed in the hanging mechanism.

Any type of robotic arm, such as cantilever robotic arm (4) or articulated robotic arm (6) can be installed on the vacuum-based wall adhesion mechanism (A). Any type of retractable rod (61) can be installed on the hanging cage (9) that is lifted by a hoist (91). X-axis power linear actuator (7), Y-axis power linear actuator (8) and/or retractable rod (61) can be selectively used according to the configuration of the building wall to be cleaned. The power is not limited to electricity, hydraulic pressure, or pneumatic pressure. The transmission method is not limited to the use of screws, gears, hydraulic cylinders, pneumatic cylinders, or linear motors. It should still be covered within the scope of the present invention.

Further, the vacuum suction device (2) can be directly mounted in the vacuum-based wall adhesion mechanism (A)(A'). Alternatively, the vacuum suction device (2) can be mounted outside the vacuum-based wall adhesion mechanism (A)(A') with the use of air pipes. Further, the cleaning fluid for the automatic wall cleaning mechanism can be delivered by delivery tubes or other means to the inside or periphery of each cleaning brush wheel. Sewage recovery means may also be provided; however, it is of the known art and not within the scope of the present invention.

The robotic arm attached to the vacuum-based wall adhesion mechanism (A)(A') shall be used for the maintenance of the building's wall surface facilities, and an image monitor may be installed at an appropriate location after installing the fire-fighting device or the safety escape assistive device.

In conclusion, the automatic wall adhesion and cleaning system of the present invention can be adhered to and moved on the outer wall of a building and can be equipment with a cleaning mechanism for automatically cleaning the outer wall of the building.

What the invention claimed is:

1. An automatic wall adhesion and cleaning system, comprising a cleaning mechanism and a vacuum-based wall adhesion mechanism, said vacuum-based wall adhesion mechanism comprising a main body, a vacuum suction device, a flexible rubber track and a sealing material, said main body comprising a drive unit at each of two opposite ends thereof, said drive unit providing a power motor, said vacuum suction device being mounted between two opposite side panels of said main body and disposed between the two said drive units, said vacuum suction device comprising a plurality of vacuum suction holes arranged on a bottom side thereof in at least one row, each said vacuum suction hole being connected to a vacuum-creating hole in said vacuum suction device through an air tube and a tube connector, said vacuum-creating hole being connected to a vacuum equipment through a pipe, said flexible rubber track being mounted on two drive wheels at two opposite ends of said main body, said sealing material being bonded to said flexible rubber track to hold therein a plurality of vacuum mounts, said flexible rubber track comprising an elastic sealing edge at each of two opposite sides thereof, a plurality of transmission gears therein and a ventilation unit in air communication with each said vacuum mount at said sealing material, said ventilation unit comprising an air flow slot cut through each transmission gear of said flexible rubber track and a plurality of air holes cut through said flexible rubber track, said main body further comprising an adapter located on a top wall thereof for the connection of said cleaning mechanism;

when said vacuum equipment is activated, a vacuum suction force is created in said vacuum suction holes of said vacuum suction device, said drive wheels of said drive units at the two opposite ends of said vacuum suction device are rotatable by the respective said power motor to move said flexible rubber track; as said vacuum mounts at said sealing material are moved with said flexible rubber track into alignment with the respective said vacuum suction holes of said vacuum suction device during rotation of said drive wheels, said air flow slots and said air holes work in said flexible rubber track, causing said vacuum mounts at said sealing material to generate a vacuum suction force that adheres said vacuum-based wall adhesion mechanism to the building wall to be cleaned; during rotation of said drive wheels to move said flexible rubber track, said vacuum mounts at said sealing material are moved with said flexible rubber track so that said vacuum mounts are activated in turn to generate a vacuum suction force; as soon as said vacuum mounts at said sealing material are moved away from the corresponding said vacuum suction holes of said vacuum suction device, the vacuum suction force is disappeared; when multiple said flexible rubber tracks and multiple sets of said drive wheels are provided, said vacuum-based wall adhesion mechanism is controllable to do forward, backward and steering movements.

2. The automatic wall adhesion and cleaning system as claimed in claim 1, wherein said vacuum-based wall adhesion mechanism is a wheeled design, comprising a main body, a vacuum suction device mounted in said main body, said vacuum suction device comprising a plurality of vacuum suction holes, a plurality of vacuum-creating holes connected to a vacuum equipment through air pipes, a sealing material mounted on a bottom suction surface of said vacuum suction device, a plurality of vacuum mounts mounted in said sealing material corresponding to the respective said vacuum suction holes of said vacuum suction device so that when the vacuum pump is activated, a suction force is created in each said vacuum suction hole of said the vacuum suction device, moving wheels provided at two opposite ends of said main body and a power motor provided for rotating said moving wheel; alternatively, a hoist is used with safety hoisting ropes to control movement of said moving wheels instead of said power motor; said moving wheels at each end of said main body is mounted in a wheel holder, each said wheel holder is coupled to a telescopic mechanism that is operable to move said wheel holder to adjust the elevation of the associating said moving wheels; as soon as said vacuum-based wall adhesion mechanism reaches the expected location, said telescopic mechanism is controlled to lift said wheel holders, retracting said moving wheels inwardly from the suction surface of said vacuum suction device so that the suction surface of said vacuum suction device is kept in close contact with the building wall to be cleaned, enhancing the suction force of said vacuum-based wall adhesion mechanism, said telescopic mechanism being mainly used to control the elevation of said moving wheels and not limited to a specific structural form; a motor or an electromagnet or a telescopic cylinder is usable to substitute for said telescopic mechanism, said main body being mounted with an adapted for holding said cleaning mechanism.

3. The automatic wall adhesion and cleaning system as claimed in claim 2, wherein said vacuum equipment is selectively a vacuum pump, a vacuum generator or other equipment capable of creating a vacuum and is mountable on said vacuum-based wall adhesion mechanism or at a location outside said vacuum-based wall adhesion mechanism and connected to said vacuum-based wall adhesion mechanism through a vacuum pipe.

4. The automatic wall adhesion and cleaning system as claimed in claim 2, wherein before the operation of said vacuum-based wall adhesion mechanism, safety hoisting ropes are suspended and controlled by a sensor or a control program, so that the lifting speed of said hoist that controls said safety hoisting ropes is consistent with the traveling speed of said vacuum-based wall adhesion mechanism; subject to the control of an upper suspension cantilever, said safety hoisting ropes and said vacuum-based wall adhesion mechanism are controlled to move left and right and up and down synchronously on the building wall to be cleaned; said hoist is mountable on said vacuum-based wall adhesion mechanism or installed at an appropriate position of said upper suspension cantilever.

5. The automatic wall adhesion and cleaning system as claimed in claim 2, wherein said cleaning mechanism comprises a robotic arm mounted on said vacuum-based wall adhesion mechanism, and at least one cleaning brush wheel mounted on a distal end of said robotic arm, said cleaning brush wheel being selectively made in different forms or using different materials in response to different wall surface cleaning needs, said robotic arm being selectively a cantilever robotic arm or an articulated robotic arm.

6. The automatic wall adhesion and cleaning system as claimed in claim 2, wherein a coupler is installed on said vacuum-based wall adhesion mechanisms to hold an X-axis power linear actuator, said X-axis power linear actuator having two opposite ends thereof respectively affixed to two vacuum-based wall adhesion mechanisms and supporting a moving carriage that is movable left and right in X-axis so that said X-axis power linear actuator is controlled to move said cleaning mechanism in the X-axis direction; said adapter is installed on said moving carriage to support said cleaning mechanism so that said cleaning mechanism is movable left and right in the X-axis (horizontal) direction and, at this time, the two said vacuum-based wall adhesion mechanisms at the two opposite ends of said X-axis power linear actuator are disposed in close contact with the building wall to be cleaned, and thus, no additional vacuum-based wall adhesion mechanisms are necessary on said cleaning mechanism at said adapter of said moving carriage.

7. The automatic wall adhesion and cleaning system as claimed in claim 2, wherein when four said vacuum-based wall adhesion mechanisms are used, these said vacuum-based wall adhesion mechanisms are arranged in two sets and disposed at different elevations with an adapter provided in each set of said vacuum-based wall adhesion mechanisms to hold a Y-axis power linear actuator that supports a moving carriage, each said Y-axis power linear actuator being controlled to move the associating said moving carriage up and down; an X-axis power linear actuator is provided between the said moving carriages of said two Y-axis power linear actuators to support a moving carriage, said X-axis power linear actuator being controllable to move said moving carriage left and right in the horizontal direction; said cleaning mechanism is installed on said adapter at the said moving carriage of said X-axis power linear actuator; subject to the adhesion of the four said vacuum-based wall adhesion mechanisms to the building wall to be cleaned, the said cleaning mechanism on said X-axis power linear actuator is movable in the X-axis direction as well as the Y-axis direction to clean the building wall thoroughly; in this case, said automatic wall cleaning mechanism is movable flexibly even if no moving traveling device is installed on said four vacuum-based wall adhesion mechanisms.

8. The automatic wall adhesion and cleaning system as claimed in claim 2, further comprising a hanging mechanism in the form of a hanging cage, and an X-axis power linear actuator installed on said hanging mechanism to support a moving carriage that is drivable to move on said X-axis power linear actuator horizontally toward the left or right side; said cleaning mechanism is installed on the said adapter that is mounted on the said moving carriage of said X-axis power linear actuator so that said cleaning mechanism at the said moving carriage is movable smoothly on said X-axis power linear actuator in the horizontal direction; a retractable rod is mounted at each of two opposite sides of said hanging mechanism; the said vacuum-based wall adhesion mechanisms are mounted at the ends of said retractable rods; subject to the coupling between said retractable rods and said vacuum-based wall adhesion mechanisms, said cleaning mechanism is maintained stable during the cleaning operation.

9. The automatic wall adhesion and cleaning system as claimed in claim 1, wherein said vacuum equipment is selectively a vacuum pump, a vacuum generator or other equipment capable of creating a vacuum and is mountable on said vacuum-based wall adhesion mechanism or at a location outside said vacuum-based wall adhesion mechanism and connected to said vacuum-based wall adhesion mechanism through a vacuum pipe.

10. The automatic wall adhesion and cleaning system as claimed in claim 1, wherein before the operation of said vacuum-based wall adhesion mechanism, safety hoisting ropes are suspended and controlled by a sensor or a control program, so that the lifting speed of said hoist that controls said safety hoisting ropes is consistent with the traveling speed of said vacuum-based wall adhesion mechanism; subject to the control of an upper suspension cantilever, said safety hoisting ropes and said vacuum-based wall adhesion mechanism are controlled to move left and right and up and down synchronously on the building wall to be cleaned; said hoist is mountable on said vacuum-based wall adhesion mechanism or installed at an appropriate position of said upper suspension cantilever.

11. The automatic wall adhesion and cleaning system as claimed in claim 1, wherein said cleaning mechanism comprises a robotic arm mounted on said vacuum-based wall adhesion mechanism, and at least one cleaning brush wheel mounted on a distal end of said robotic arm, said cleaning brush wheel being selectively made in different forms or using different materials in response to different wall surface cleaning needs, said robotic arm being selectively a cantilever robotic arm or an articulated robotic arm.

12. The automatic wall adhesion and cleaning system as claimed in claim 11, wherein said robotic arm attached to said vacuum-based wall adhesion mechanism is used for the maintenance of the building's wall surface facilities, and an image monitor is installed at an appropriate location after installing the fire-fighting device or the safety escape assistive device.

13. The automatic wall adhesion and cleaning system as claimed in claim 1, wherein a coupler is installed on said vacuum-based wall adhesion mechanisms to hold an X-axis power linear actuator, said X-axis power linear actuator having two opposite ends thereof respectively affixed to two vacuum-based wall adhesion mechanisms and supporting a moving carriage that is movable left and right in X-axis so that said X-axis power linear actuator is controlled to move said cleaning mechanism in the X-axis direction; said adapter is installed on said moving carriage to support said cleaning mechanism so that said cleaning mechanism is movable left and right in the X-axis (horizontal) direction and, at this time, the two said vacuum-based wall adhesion mechanisms at the two opposite ends of said X-axis power linear actuator are disposed in close contact with the building wall to be cleaned, and thus, no additional vacuum-based wall adhesion mechanisms are necessary on said cleaning mechanism at said adapter of said moving carriage.

14. The automatic wall adhesion and cleaning system as claimed in claim 13, wherein a Z-axis retractable rod is mounted on each of the two said vacuum-based wall adhesion mechanisms to support said X-axis power linear actuator; by means of synchronously extending out or retracting the two said retractable rods, said cleaning mechanism at said X-axis power linear actuator is movable with the safety hoisting ropes in the Y-axis direction, and thus, said cleaning mechanism is movable in X-axis, Y-axis and Z-axis directions relative to the building wall to be cleaned.

15. The automatic wall adhesion and cleaning system as claimed in claim 1, wherein when four said vacuum-based wall adhesion mechanisms are used, these said vacuum-based wall adhesion mechanisms are arranged in two sets and disposed at different elevations with an adapter provided in each set of said vacuum-based wall adhesion mechanisms to hold a Y-axis power linear actuator that supports a moving carriage, each said Y-axis power linear actuator being controlled to move the associating said moving carriage up and down; an X-axis power linear actuator is provided between the said moving carriages of said two Y-axis power linear actuators to support a moving carriage, said X-axis power linear actuator being controllable to move said moving carriage left and right in the horizontal direction; said cleaning mechanism is installed on said adapter at the said moving carriage of said X-axis power linear actuator; subject to the adhesion of the four said vacuum-based wall adhesion mechanisms to the building wall to be cleaned, the said cleaning mechanism on said X-axis power linear actuator is movable in the X-axis direction as well as the Y-axis direction to clean the building wall thoroughly; in this case, said automatic wall cleaning mechanism is movable flexibly even if no moving traveling device is installed on said four vacuum-based wall adhesion mechanisms.

16. The automatic wall adhesion and cleaning system as claimed in claim 15, wherein said adapter at said Y-axis power linear actuator comprises a plurality of male adapter members and a plurality of female adapter members, said female adapter members being installed on the building wall to be cleaned, said male adapter members being mounted at said Y-axis power linear actuator for connection to the respective said female adapter members to secure said Y-axis power linear actuator to the building wall and thus, said Y-axis power linear actuator without said vacuum-based wall adhesion mechanisms is secured to the building wall for allowing said cleaning mechanism that is installed on the said moving carriage of said X-axis power linear actuator to be moved vertically and horizontally, said male and female adapter members being variously embodied for positively securing said Y-axis power linear actuator to the building wall to be cleaned; an actuator coupling is used to connect two said Y-axis power linear actuators in a series, extending the moving distance of said moving carriage.

17. The automatic wall adhesion and cleaning system as claimed in claim 1, further comprising a hanging mechanism in the form of a hanging cage, and an X-axis power linear actuator installed on said hanging mechanism to support a moving carriage that is drivable to move on said X-axis power linear actuator horizontally toward the left or right side; said cleaning mechanism is installed on the said adapter that is mounted on the said moving carriage of said X-axis power linear actuator so that said cleaning mechanism at the said moving carriage is movable smoothly on said X-axis power linear actuator in the horizontal direction; a retractable rod is mounted at each of two opposite sides of said hanging mechanism; the said vacuum-based wall adhesion mechanisms are mounted at the ends of said retractable rods; subject to the coupling between said retractable rods and said vacuum-based wall adhesion mechanisms, said cleaning mechanism is maintained stable during the cleaning operation.

\* \* \* \* \*